United States Patent [19]

Hawes

[11] Patent Number: 4,508,860

[45] Date of Patent: Apr. 2, 1985

[54] DISCONTINUOUS FIBER PRETREATMENT

[75] Inventor: David H. Hawes, Mt. Pleasant, S.C.

[73] Assignee: Westvaco Corporation, New York, N.Y.

[21] Appl. No.: 587,047

[22] Filed: Mar. 7, 1984

Related U.S. Application Data

[63] Continuation-in-part of Ser. No. 352,229, Feb. 25, 1982, abandoned.

[51] Int. Cl.³ .................................................. B32B 5/16
[52] U.S. Cl. .................................... 524/13; 524/35; 524/733; 524/808; 523/207; 8/116.1; 8/189
[58] Field of Search ............... 523/207; 527/103; 524/13, 14, 15, 27, 35, 733, 799, 808; 34/159; 156/327; 106/163.1; 8/116 R, 181, 189, 129

[56] References Cited

U.S. PATENT DOCUMENTS

| | | | |
|---|---|---|---|
| 2,050,197 | 8/1936 | Sebrell | 8/181 |
| 2,289,275 | 7/1942 | Orthner et al. | 8/181 |
| 2,594,280 | 4/1952 | Beaudet | 523/207 |
| 2,601,598 | 6/1952 | Daniel, Jr. et al. | 162/167 |
| 3,398,045 | 8/1968 | Clayton et al. | 428/266 |
| 3,644,268 | 2/1972 | Morita | 524/509 |
| 3,697,364 | 10/1972 | Boustany et al. | 428/266 |
| 3,709,845 | 1/1973 | Boustany et al. | 523/220 |
| 3,836,412 | 9/1974 | Boustany et al. | 156/62.2 |
| 3,943,079 | 3/1976 | Hamed | 524/14 |
| 4,151,327 | 4/1979 | Lawton | 428/447 |
| 4,244,847 | 1/1981 | Posiviata et al. | 524/14 |
| 4,248,743 | 2/1981 | Goettler | 524/14 |
| 4,263,184 | 4/1981 | Leo et al. | 524/14 |
| 4,393,020 | 7/1983 | Li et al. | 264/108 |

FOREIGN PATENT DOCUMENTS

| | | | |
|---|---|---|---|
| 444363 | 3/1936 | United Kingdom | 524/13 |

*Primary Examiner*—John Kight
*Assistant Examiner*—Nathan M. Nutter
*Attorney, Agent, or Firm*—Terry B. McDaniel; Richard L. Schmalz

[57] ABSTRACT

In a method of incorporating fibers in a rubber matrix, an improved fiber pretreatment is disclosed which comprises mixing from 3% to 15% by weight vinyl pyridine latex with a fiber-in-water mixture of essentially delignified hardwood fibers which have not been subjected to post-delignification drying, said mixture having a consistency of from 10% to 40% solids, subsequently expressing water and drying the treated fiber.

7 Claims, No Drawings

DISCONTINUOUS FIBER PRETREATMENT

This application is a continuation-in-part of application Ser. No. 352,229 filed Feb. 25, 1982, now abandoned.

BACKGROUND OF THE INVENTION (1) Field of the Invention

This invention relates to treating fibers used in the manufacture of composites of discontinuous fiber and a polymer matrix and particularly to processes for preparing improved treated cellulose fiber.

(2) Description of the Prior Art

Discontinuous fibers have long been used as fillers or reinforcements for polymer and elastomeric materials. The fibers may be unregenerated cellulose such as cotton or fiberized wood, such as wood pulp, or fiberized synthetic filaments such as nylon, aramid, polyester or glass. Cellulosic or synthetic fibers have not only been used as fillers, but they have also been used as reinforcements in rubber articles such as tires, hose and power transmission belts. As particularly discussed in U.S. Pat. Nos. 3,697,364 and 3,709,845, it is very difficult to mix fibers into massed rubber with good dispersion because the fibers tend to cling together in bundles or prills rather than being homogeneously dispersed into the rubber.

The above cited references teach improvements for dispersing and bonding discontinuous cellulosic fibers, or mixtures thereof, in a viscoelastomeric matrix to yield a vulcanized composite with increased Young's modulus. As taught thereby, fiber dispersity in rubber is enhanced by a process that involves slurrying pulped and dried fibers in water at about 2% consistency, adding liquid latex, and coagulating the latex on the fibers. The coagulation is filtered and dried leaving "pellets" or "curd" agglomerations of latex encapsulating and bonding together clusters of unoriented fibers. The object of the latex coating on the fiber clusters is to reduce fiber-to-fiber interactions and fiber breakage when the pellets are dispersed in a viscoelastomer with an intensive mixing means such as a cold-feed extruder, Banbury mixer or mill. Alternatively, carbon black may be added to the slurried fiber as a partitioning agent to reduce fiber-fiber interaction.

U.S. Pat. No. 3,836,412 also teaches treating cellulose fibers with elastomer in an aqueous slurry to improve the properties of later formed vulcanizable elastomer-treated fiber composite. The fiber treatment is taught to occur in aqueous slurries of from 1.66 to 2% consistencies formed by slurrying pulped and dried wrapping paper fibers.

U.S. Pat. No. 3,943,079 teaches pretreating unregenerated cellulose fibers prior to their dispersion in a polymer matrix by mixing minor proportions of a plastic polymer and a lubricant with the fiber under shearing forces. The required amount of plastic polymer is taught to depend on the type and amount of lubricant.

The present invention simplifies the preparation of treated fiber and provides an improved polymer treated fiber which evenly disperses in an elastomeric matrix quickly and provides an improved composite.

SUMMARY OF THE INVENTION

It has been discovered that improved pretreated discontinuous fiber, preferably unregenerated cellulose fiber, can be simply prepared by treating never dried hardwood fibers with small amounts of vinyl pyridine latex in the absence of a lubricant or other partitioning agents. A small amount (3% to 15% by weight) of vinyl pyridine latex is mixed with a relatively high consistency (10% to 40% solids) fiber-in-water mixture of the fiber under low shearing forces. Subsequently, with starting fiber-in-water mixture consistencies less than 25%, a major portion of water is removed by pressing and the fiber is dried. At starting fiber-in-water mixture consistencies from 25% to 40%, subsequent expression of water may not be required. Preferably, the fiber is dried using a spray drier. More preferably, the fiber is subjected to "fluffing" with a disk refiner after water removal by pressing and before spray drying.

Improvements in strength of fiber-reinforced rubber matrices are achieved by selecting hardwood fibers which have been essentially delignified by the kraft process but which have not been subjected to a post-delignification drying process, i.e., never dried pulp. Further, never dried hardwood fibers provide the processor with energy cost savings.

DESCRIPTION OF THE PREFERRED EMBODIMENT

In the invention process, water is expressed from a pulped hardwood fiber aqueous slurry to form a 10% to 40% consistency (solids) fiber-in-water mixture of hardwood fibers, which fibers have been essentially delignified but which have not been subjected to a post-delignification drying process. At up to about 12% consistency the fiber-in-water is a pumpable slurry; from above 12% to about 24% the fiber-in-water is non-pumpable: and from about 25% to about 40% the fiber-in-water mixture is a "cake". It is not practical to express water from the pulp beyond 40% consistency.

The hardwood fiber-in-water mixture is treated with from 3% to 15% vinyl pyridine latex, based on the dry weight of the hardwood fibers. Efficient coagulation of latex on fiber normally occurs with mixing. The supernatant liquor should be relatively clear and contain less than 1% of the added vinyl pyridine latex. If, after initial addition of the latex, the supernatant liquor contains more than 1% of the vinyl pyridine latex, the fibers should first be treated with acetic acid to aid in coagulation to make the later-added latex substantive to the fibers. Within the ranges of additives and fiber consistencies specified there is permissible variability in the preparation of these treated pulps.

In one preferred embodiment the never-dried pulp has a consistency of 25% to 40% when treated with the vinyl pyridine latex, since at this starting consistency it is not necessary to express water from the treated fiber after treatment. This results in an energy savings, and latex that may have been carried off with the water will be saved.

Also, essentially delignified hardwood fibers which have been subjected to a bleaching process are preferred over unbleached fibers, as any residual lignin in the fibers will prevent optimum polymerization of the latex.

In another embodiment of the invention process, bleached hardwood pulp (6387 grams at 18.79% consistency) was diluted in 20 liters of water. Acetic acid (10 milliliters in 1 liter of water) was added to the pulp slurry while stirring. (Alternatively, $CO_2$ may be employed to initiate precipitation of the latex.) After about 5 minutes of stirring, water was removed from the slurry by suction to yield an acid treated pulp of about 45% consistency. A sufficient amount of water is added to the wet cake of pulp to bring the consistency down to a range of 15% to 20% solids.

This acid treated pulp is treated next with a preferred amount of from 5% to 10% vinyl pyridine latex, based on the dry weight of the pulp. (As noted above, the acid pretreatment step is not necessary where the vinyl pyridine latex is made substantive to the wood fibers simply by stirring.) The vinyl pyridine latex is mixed with the pulp in a dough mixer, such as a Hobart mixer, although most any type of mixer could be used.

Amounts of other ingredients, such as bonding agents, fillers and reinforcing pigments, may be added but are usually incorporated when the treated fibers are mixed with additional polymer. However, it is sometimes advantageous to incorporate small amounts of reinforcing pigments such as carbon black or silica into the treated fibers because, in some instances, they appear to facilitate disentanglement of the fibers.

The supernatant liquor is removed by suction resulting in a wet cake which is then pressed to remove the remaining free water and providing a pulp of a consistency of about 50% solids. This pulp is preferably fluffed in a refiner or other type of fluffing device prior to drying to approximately 95% solids in a drying device which impedes interfiber bonding, preferably a spray dryer. Although not necessary to the invention process, agglomeration of the treated fibers can be further ameliorated by adding an oil, such as Sundex® 8125, after pressing but before fluffing. The resulting treated fiber material may then be compounded directly into the rubber.

The compounding of the treated fibers into the rubber matrix is accomplished on a roll mill. The treated fibers, comprising approximately 93.5 parts cellulose and 9.4 parts vinyl pyridine latex, are added, along with various curatives, to a rubber masterbatch of the following formulation.

| SBR 1502 | 145.6 |
| Carbon black (HAF) | 91 |
| Hi-Sil | 27.3 |
| ZnO | 5.4 |
| Stearic Acid | 3.63 |
| Antoz 67F | 1.87 |

The curatives added with the treated fibers during compounding were as follows:

| Hexamethylenetetramine | 2.91 |
| Resorcinol | 4.55 |
| Sulfur | 3.64 |
| Accelerator | 1.82 |

Also, if oil was not added to the treated fibers prior to fluffing, it can be added separately during the compounding on the roll mill in the amount of approximately 18.7 parts.

Specific embodiments are shown in the following examples.

EXAMPLE 1

To show the fiber pretreatment method claimed, 300 grams (oven dried basis) of bleached hardwood pulp produced by the kraft process but which had not been subjected to post-delignification drying, at 17% consistency was treated with either 5%, 10% or 15% Gen-Tac® vinyl pyridine latex, based on the dry weight of the pulp. The pulp treatment was conducted under low shear stirring in a Hobart dough mixer for about five minutes. This amount of time is usually more than sufficient for the latex to precipitate onto individual fibers such that no clumps of coagulant are formed and the supernatant liquor, when separated from the coated fibers, is clear and no longer white.

The supernatant liquor was removed by pressing the wet cake of coated fibers in a screw press resulting in a pulp of about 50% solids. The treated pulp was passed through a refiner (disk or similar type) to "fluff" the material prior to drying. The fluffed treated pulp was then dried in a Bowen laboratory spray drier to approximately 95% solids. The resulting treated fiber samples (5%, 10% and 15% vinyl pyridine latex amounts) were compounded directly into the rubber to form composites according to the processed described hereinbefore.

The fiber is oriented by repeated passes of the composite through a rubber mill, the rolls of which are set at 0.07 in. (1.8 mm.) and the composites cured by heating in a press at 153° C. for 35 min. Samples were cut from the cured sheet product and pulled on an Instron tensile testing machine in the direction of orientation at a loading speed of 0.1 in. per inch per minute.

The prepared composites were evaluated also for peak percent elongation and 5% secant modulus. The method for determining the 5% secant modulus is discussed in U.S. Pat. No. 3,697,364 at column 6, line 42 thru column 7, line 4. The results of these tests were compared to a similar evaluation of the industry standard for rubber-cellulose composites, Santoweb® D. The comparison of this data is shown in Table I below.

TABLE I

VINYL PYRIDINE LATEX TREATED PULPS
PARTS PER HUNDRED PULP (PHP)

| | Amount of Vinyl Pyridine Latex in Pretreatment | | | |
| --- | --- | --- | --- | --- |
| | 5 php | 10 php | 15 php | SANTOWEB |
| Peak Tensile | 2600 | 2230 | 1850 | 1850 |
| Peak Elongation | 6 | 9 | 12 | 14 |
| 5% Modulus | 56,000 | 35,100 | 22,900 | 24,800 |
| Run # | 185 | 181 | 187 | 193 |

The above data show that the samples prepared from bleached hardwood pulp pretreated with 5%, 10% and 15% vinyl pyridine latex, based on the weight of the pulp, performed as well as or, in the cases of 5% and 10% vinyl pyridine latex, better than the industry standard.

EXAMPLE 2

The improvement in composite properties resulting from selecting never dried bleached hardwood pulp for fiber pretreatment over a dried bleached hardwood pulp can be seen from Table II, below.

Two sample composites were similarly prepared; one using bleached hardwood pulp which had been dried and the other using a never dried bleached hardwood pulp. The pulp fibers were treated with 10% vinyl pyridine latex and the dried treated fibers then were compounded into the rubber matrix as described above. Upon curing, the samples were tested in the manner of Example 1 and the data reported in Table II.

TABLE II

COMPARISON OF DRIED VS. NEVER DRIED PULP

| Run # | Pulp | 30 Minute Cure | | | 45 Minute Cure | | |
|---|---|---|---|---|---|---|---|
| | | Tensile | Elongation | Modulus | Tensile | Elongation | Modulus |
| 161 | Dried | 1600 | 9.0 | 27,500 | 1520 | 11 | 23,300 |
| 186 | Never Dried | 1900 | 7.0 | 29,700 | 2400 | 9 | 40,400 |

The data from Table II indicate improved tensile strength, elongation and modulus properties in the sample prepared with never dried pulp.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. In a method of incorporating unregenerated discontinuous cellulose fibers within a vulcanizable elastomeric matrix, a fiber pretreatment which consists essentially of mixing from 3% to 15% by weight vinyl pyridine latex with a fiber-in-water mixture of essentially delignified hardwood fibers which have not been subjected to post-delignification drying, said mixture having a consistency of from 10% to 40% solids, subsequently expressing water and drying the treated fiber.

2. The method of claim 1 wherein the drying step is performed by spray drying.

3. The method of claim 1 wherein the hardwood fibers are bleached hardwood fibers.

4. The method of claim 1 wherein the fiber-in-water mixture from which water has been expressed to a consistency from 25% to 40% and thereby eliminating the subsequent water expression.

5. The method of claim 1 wherein the vinyl pyridine latex is from 5% to 10% by weight of the fiber-latex mixture.

6. The method of claim 1 wherein the latex treated fiber is fluffed in a disk refiner after expressing water therefrom and before drying the treated fiber.

7. The method of claim 1 wherein the fiber-in-water mixture has been treated with acetic acid before vinyl pyridine latex addition.

* * * * *